(12) United States Patent
Xie et al.

(10) Patent No.: US 12,257,877 B2
(45) Date of Patent: Mar. 25, 2025

(54) VEHICLE THERMAL MANAGEMENT SYSTEM OF AN ELECTRIC VEHICLE AND CONTROL METHOD THEREOF

(71) Applicant: Kelvin New Energy Technology Co., Ltd., Shanghai (CN)

(72) Inventors: Haijun Xie, Shanghai (CN); Yujun Dong, Shanghai (CN); Xinding Guan, Shanghai (CN); Henry Xiaoli Huai, Shanghai (CN); Gangping Fu, Shanghai (CN)

(73) Assignee: Kelvin New Energy Technology Co., Ltd., Shanghai (CN)

( * ) Notice: Subject to any disclaimer, the term of this patent is extended or adjusted under 35 U.S.C. 154(b) by 197 days.

(21) Appl. No.: 18/081,227

(22) Filed: Dec. 14, 2022

(65) Prior Publication Data

US 2023/0356559 A1 Nov. 9, 2023

(30) Foreign Application Priority Data

Mar. 30, 2022 (CN) .......................... 202210327951.4

(51) Int. Cl.
*B60H 1/00* (2006.01)
*B60H 1/32* (2006.01)

(52) U.S. Cl.
CPC ..... *B60H 1/00278* (2013.01); *B60H 1/00392* (2013.01); *B60H 1/00735* (2013.01); *B60H 1/00885* (2013.01); *B60H 1/32284* (2019.05); *B60H 2001/00307* (2013.01)

(58) Field of Classification Search
CPC ............ B60H 1/00278; B60H 1/00392; B60H 1/32284
See application file for complete search history.

(56) References Cited

U.S. PATENT DOCUMENTS

| | | | |
|---|---|---|---|
| 10,625,563 B2* | 4/2020 | Kim | B60H 1/00885 |
| 10,953,726 B2* | 3/2021 | Carlson | H01M 10/44 |
| 11,021,041 B2* | 6/2021 | He | B60H 1/00507 |
| 11,130,385 B2* | 9/2021 | Boger | B60K 11/04 |
| 11,446,978 B2* | 9/2022 | Bara | B60H 1/00392 |
| 11,479,076 B2* | 10/2022 | Kim | B60H 1/00485 |
| 11,541,726 B2* | 1/2023 | Orihashi | B60H 1/00392 |

(Continued)

*Primary Examiner* — Christopher R Zerphey
(74) *Attorney, Agent, or Firm* — Sandberg Phoenix & von Gontard, PC.

(57) ABSTRACT

Provided are a vehicle thermal management system of an electric vehicle and a control method thereof. The vehicle thermal management system of an electric vehicle includes a refrigeration assembly, a cabin heat exchanger, a motor-drive-side heat exchange assembly, a battery heat exchanger, and a radiator tank. The outlet of the cabin heat exchanger communicates with one of the heat exchange inlet of a chiller or the heat exchange inlet of a cabin evaporator. The inlet of the motor-drive-side heat exchange assembly communicates with at least one of the outlet of the cabin heat exchanger, the heat exchange outlet of the chiller, or the heat exchange outlet of a water-cooled condenser. The outlet of the motor-drive-side heat exchange assembly communicates with at least one of the heat exchange inlet of the water-cooled condenser or the inlet of the cabin heat exchanger.

8 Claims, 9 Drawing Sheets

(56) References Cited

U.S. PATENT DOCUMENTS 11,634,004 B2 * 4/2023 Kim ..................... B60H 1/323
                                                  62/259.2
11,654,744 B2 * 5/2023 Kim ................... B60H 1/00821
                                                  62/159

* cited by examiner

VEHICLE THERMAL MANAGEMENT SYSTEM OF AN ELECTRIC VEHICLE AND CONTROL METHOD THEREOF

CROSS-REFERENCE TO RELATED APPLICATION(S)

This application claims priority to Chinese Patent Application No. 202210327951.4 filed Mar. 30, 2022, the disclosure of which is incorporated herein by reference in its entirety.

TECHNICAL FIELD

The present disclosure relates to the field of vehicle thermal management technology and, in particular, to a vehicle thermal management system of an electric vehicle and a control method thereof.

BACKGROUND

When the existing vehicle thermal management system of an electric vehicle heats or cools a motor-drive-side heat exchange assembly, the circulating liquid in a radiator tank first absorbs or releases heat in a condenser of a refrigeration assembly, and then the circulating liquid flows through the motor-drive-side heat exchange assembly to heat or cool the motor-drive-side heat exchange assembly. This heat exchange method has the problem of low heat exchange efficiency. As a result, it is not conducive to the implementation of the vehicle thermal management system of an electric vehicle.

SUMMARY

On the basis of the preceding description, the present disclosure is to provide a vehicle thermal management system of an electric vehicle and a control method thereof to improve the heat exchange efficiency of the vehicle thermal management system of an electric vehicle.

A vehicle thermal management system of an electric vehicle includes a refrigeration assembly, a cabin heat exchanger, a motor-drive-side heat exchange assembly, a battery heat exchanger, and a radiator tank. The refrigeration assembly includes a compressor, two condensers, and two evaporators. The compressor can communicate with one of the two condensers and at least one of the two evaporators. The two condensers are an air-cooled condenser and a water-cooled condenser respectively. The two evaporators are a cabin evaporator and a chiller respectively. The cabin heat exchanger is configured to heat or cool a cabin. The inlet of the cabin heat exchanger can communicate with the heat exchange outlet of the cabin evaporator. The outlet of the cabin heat exchanger can communicate with one of the heat exchange inlet of the chiller or the heat exchange inlet of the cabin evaporator. The motor-drive-side heat exchange assembly is configured to cool a motor drive. The inlet of the motor-drive-side heat exchange assembly can communicate with at least one of the outlet of the cabin heat exchanger, the heat exchange outlet of the chiller, or the heat exchange outlet of the water-cooled condenser. The outlet of the motor-drive-side heat exchange assembly can communicate with at least one of the heat exchange inlet of the water-cooled condenser or the inlet of the cabin heat exchanger. The battery heat exchanger is configured to heat or cool a battery. The inlet of the battery heat exchanger communicates with the heat exchange outlet of the chiller. The outlet of the battery heat exchanger can communicate with one of the inlet of the motor-drive-side heat exchange assembly or the heat exchange inlet of the chiller. The inlet of the radiator tank can communicate with the outlet of the motor-drive-side heat exchange assembly. The outlet of the radiator tank can communicate with one of the inlet of the motor-drive-side heat exchange assembly or the heat exchange inlet of the chiller.

In a solution of the vehicle thermal management system of an electric vehicle, the vehicle thermal management system of an electric vehicle also includes a first three-way valve and a second three-way valve. The first three-way valve is formed with a first communication hole, a second communication hole, and a third communication hole. The first communication hole can communicate with one of the second communication hole or the third communication hole. The second three-way valve is formed with a fourth communication hole, a fifth communication hole, and a sixth communication hole. The fourth communication hole can communicate with one of the fifth communication hole or the sixth communication hole. The first communication hole communicates with the outlet of the motor-drive-side heat exchange assembly. The second communication hole communicates with the fourth communication hole. The third communication hole communicates with the inlet of the radiator tank. The fifth communication hole communicates with the inlet of the cabin heat exchanger. The third communication hole communicates with the heat exchange inlet of the water-cooled condenser.

In a solution of the vehicle thermal management system of an electric vehicle, the vehicle thermal management system of an electric vehicle also includes a third three-way valve. The third three-way valve is formed with a seventh communication hole, an eighth communication hole, and a ninth communication hole. The seventh communication hole can communicate with one of the eighth communication hole or the ninth communication hole. The seventh communication hole communicates with at least one of the two evaporators. The eighth communication hole communicates with the air-cooled condenser. The ninth communication hole communicates with the chiller.

In a solution of the vehicle thermal management system of an electric vehicle, the vehicle thermal management system of an electric vehicle also includes a first four-way reversing valve. The first four-way reversing valve includes a first reversing inlet, a second reversing inlet, a first reversing outlet, and a second reversing outlet. The first reversing inlet communicates with one of the first reversing outlet or the second reversing outlet. The second reversing inlet communicates with another one of the first reversing outlet or the second reversing outlet. The first reversing inlet communicates with one of the outlet of the radiator tank or the heat exchange outlet of the water-cooled condenser. The second reversing inlet communicates with the outlet of the battery heat exchanger. The first reversing outlet communicates with the heat exchange inlet of the chiller. The second reversing outlet communicates with the inlet of the motor-drive-side heat exchange assembly.

In a solution of the vehicle thermal management system of an electric vehicle, the vehicle thermal management system of an electric vehicle also includes a water-cooled solenoid valve. The outlet of the water-cooled solenoid valve is located between the outlet of the radiator tank and the first reversing inlet. The inlet of the water-cooled solenoid valve is located between the cabin evaporator and the cabin heat exchanger.

In a solution of the vehicle thermal management system of an electric vehicle, the vehicle thermal management system of an electric vehicle also includes an economizer throttle valve and an economizer body. The economizer body is formed with a first connection hole, a second connection hole, an inlet, and an outlet. The first connection hole communicates with one of the two condensers through a connecting pipe. The outlet of the economizer throttle valve communicates with the inlet. The inlet of the economizer throttle valve communicates with the connecting pipe. The outlet communicates with the compressor. The second connection hole communicates with one of the two evaporators.

In a solution of the vehicle thermal management system of an electric vehicle, the vehicle thermal management system of an electric vehicle also includes a first heating member and a second heating member. The first heating member is located on an upstream pipe of the heat exchange inlet of the chiller. The second heating member is disposed on the cabin.

In a solution of the vehicle thermal management system of an electric vehicle, the refrigeration assembly also includes a first expansion valve, a second expansion valve, and a third expansion valve. The two evaporators are disposed in parallel. When the refrigeration assembly performs refrigeration, the first expansion valve is located at the upstream of the two evaporators, the second expansion valve is connected in series with the chiller and then connected in parallel with the cabin evaporator, and the third expansion valve is connected in series with the cabin evaporator and then connected in parallel with the chiller.

In a solution of the vehicle thermal management system of an electric vehicle, the vehicle thermal management system of an electric vehicle also includes a first water pump, a second water pump, and a third water pump. The first water pump is located between the inlet of the battery heat exchanger and the heat exchange outlet of the chiller. The second water pump is located at the outlet of the motor-drive-side heat exchange assembly. The third water pump is located at the upstream of the heat exchange inlet of the cabin evaporator to pump a circulating liquid in the cabin heat exchanger into the cabin evaporator.

A control method applied by the vehicle thermal management system of an electric vehicle according to any preceding solution includes the steps below.

When the cabin is refrigerated, the cabin evaporator communicates with the air-cooled condenser; the refrigeration assembly performs refrigeration circulation; the inlet of the cabin heat exchanger communicates with the heat exchange outlet of the cabin evaporator; and the outlet of the cabin heat exchanger communicates with the heat exchange inlet of the cabin evaporator.

When the cabin is heated, the cabin evaporator communicates with one of the two condensers; the refrigeration assembly performs heating circulation; the inlet of the cabin heat exchanger communicates with the heat exchange outlet of the cabin evaporator; and the outlet of the cabin heat exchanger communicates with the heat exchange inlet of the cabin evaporator.

When the battery is refrigerated, the chiller communicates with the air-cooled condenser; the refrigeration assembly performs refrigeration circulation; the inlet of the battery heat exchanger communicates with the heat exchange outlet of the chiller; and the outlet of the battery heat exchanger communicates with the heat exchange inlet of the chiller.

When the battery is heated, the chiller communicates with one of the two condensers; the refrigeration assembly performs heating circulation; the inlet of the battery heat exchanger communicates with the heat exchange outlet of the chiller; and the outlet of the battery heat exchanger communicates with the heat exchange inlet of the chiller.

When the motor drive is cooled by the radiator tank, the outlet of the motor-drive-side heat exchange assembly communicates with the heat exchange inlet of the radiator tank, and the inlet of the motor-drive-side heat exchange assembly communicates with the heat exchange outlet of the radiator tank.

When the battery is cooled by the radiator tank, the outlet of the motor-drive-side heat exchange assembly communicates with the heat exchange inlet of the radiator tank, and the heat exchange outlet of the radiator tank communicates with the inlet of the motor-drive-side heat exchange assembly through the chiller and the battery heat exchanger in sequence.

When the cabin is heated during winter parking by using heat generated by the battery, and the temperature of the battery is between a first preset temperature and a second preset temperature, the inlet of the battery heat exchanger communicates with the heat exchange outlet of the chiller; the outlet of the battery heat exchanger communicates with the inlet of the cabin heat exchanger through the motor-drive-side heat exchange assembly; and the outlet of the cabin heat exchanger communicates with the heat exchange inlet of the chiller.

When the cabin is heated during winter parking by using heat generated by the motor drive, and the temperature of the motor drive is higher than a third preset temperature, the inlet of the motor-drive-side heat exchange assembly communicates with the outlet of the cabin heat exchanger, and the outlet of the motor-drive-side heat exchange assembly communicates with the inlet of the cabin heat exchanger.

BRIEF DESCRIPTION OF DRAWINGS

To illustrate the solution in embodiments of the present disclosure more clearly, the drawings used in description of embodiments of the present disclosure is briefly described below. Apparently, the drawings described below merely illustrate part of embodiments of the present disclosure, and those of ordinary skill in the art can also obtain other drawings on the basis of the contents in embodiments of the present disclosure and these drawings on the premise that no creative work is done.

Figure 1:
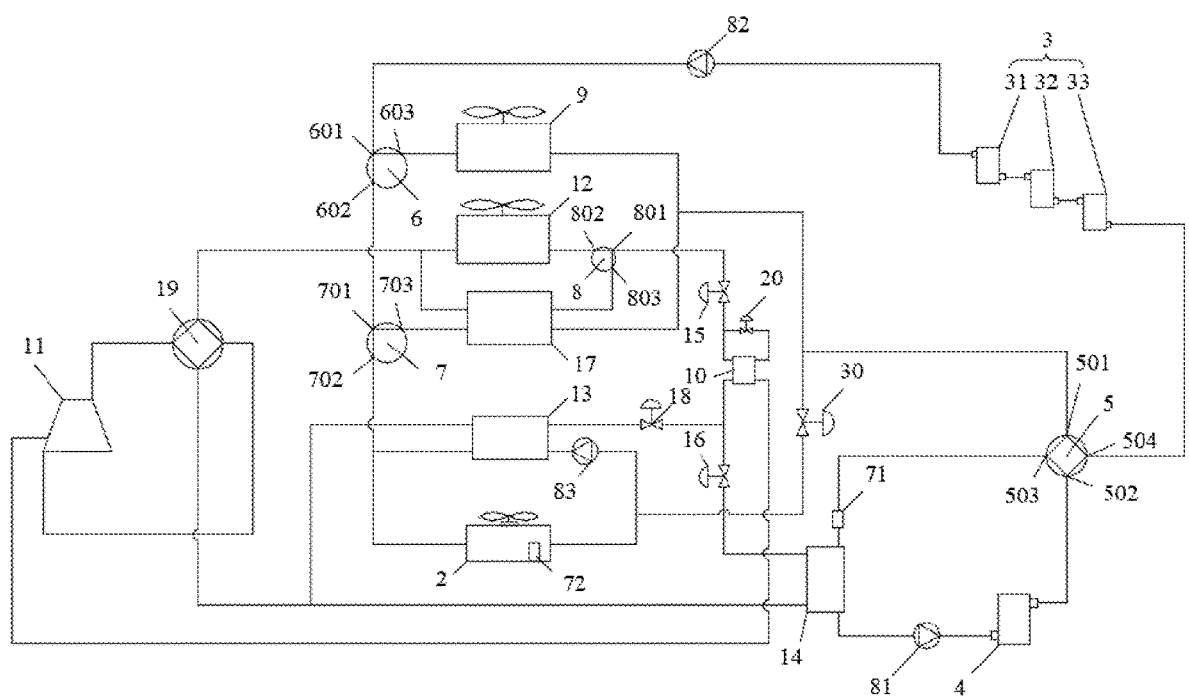
FIG. 1 is a diagram of a vehicle thermal management system of an electric vehicle according to embodiments of the present disclosure.

REFERENCE LIST 11 compressor
12 air-cooled condenser
13 cabin evaporator
14 chiller
15 first expansion valve
16 second expansion valve
17 water-cooled condenser
18 third expansion valve
19 second four-way reversing valve
2 cabin heat exchanger
3 motor-drive-side heat exchange assembly
31 motor heat exchanger
32 first driver heat exchanger
33 second driver heat exchanger
4 battery heat exchanger
5 first four-way reversing valve
501 first reversing inlet
502 second reversing inlet
503 first reversing outlet
504 second reversing outlet
6 first three-way valve
601 first communication hole
602 second communication hole
603 third communication hole
7 second three-way valve
701 fourth communication hole
702 fifth communication hole
703 sixth communication hole
71 first heating member
72 second heating member
8 third three-way valve
801 seventh communication hole
802 eighth communication hole
803 ninth communication hole
81 first water pump
82 second water pump
83 third water pump
9 radiator tank
10 economizer body
20 economizer throttle valve
30 water-cooled solenoid valve

DETAILED DESCRIPTION

To make solved problems, adopted solutions and achieved effects of the present disclosure more apparent, the solutions of embodiments of the present disclosure are described below in detail in conjunction with the drawings. Apparently, the embodiments described are part, not all, of embodiments of the present disclosure. Based on embodiments of the present disclosure, all other embodiments acquired by those skilled in the art are within the scope of the present disclosure on the premise that no creative work is done.

In the description of the present disclosure, it is to be noted that orientations or position relations indicated by terms such as "center", "upper", "lower", "left", "right", "vertical", "horizontal", "in", and "out" are based on the drawings. These orientations or position relations are intended to facilitate and simplify the description of the present disclosure and not to indicate or imply that a device or element referred to must have such particular orientations or must be configured or operated in such particular orientations. Thus, these orientations or position relations are not to be construed as limiting the present disclosure. Additionally, terms such as "first" and "second" are used merely for the purpose of description and are not to be construed as indicating or implying relative importance. Terms "first position" and "second position" are two different positions.

In the description of the present disclosure, it is to be noted that terms "mounted", "joined", and "connected" are to be understood in a broad sense unless otherwise expressly specified and limited. For example, the term "connected" may refer to "securely connected" or "detachably connected", may refer to "mechanically connected" or "electrically connected" or may refer to "connected directly", "connected indirectly through an intermediary" or "connected inside two components". For those of ordinary skill in the art, meanings of the preceding terms in the present disclosure may be construed based on situations.

An embodiment provides a vehicle thermal management system of an electric vehicle. As shown in FIG. 1, the vehicle thermal management system of an electric vehicle includes a refrigeration assembly, a cabin heat exchanger 2, a motor-drive-side heat exchange assembly 3, a battery heat exchanger 4, and a radiator tank 9. The refrigeration assembly includes a compressor 11, two condensers, and two evaporators. The compressor 11 can communicate with one of the two condensers and at least one of the two evaporators. The two condensers are an air-cooled condenser 12 and a water-cooled condenser 17 respectively. The two evaporators are a cabin evaporator 13 and a chiller 14 respectively. The cabin heat exchanger 2 is configured to heat or cool a cabin. The inlet of the cabin heat exchanger 2 can communicate with the heat exchange outlet of the cabin evaporator 13. The outlet of the cabin heat exchanger 2 can communicate with one of the heat exchange inlet of the chiller 14 or the heat exchange inlet of the cabin evaporator 13. The motor-drive-side heat exchange assembly 3 is configured to cool a motor drive. The inlet of the motor-drive-side heat exchange assembly 3 can communicate with at least one of the outlet of the cabin heat exchanger 2, the heat exchange outlet of the chiller 14, or the heat exchange outlet of the water-cooled condenser 17. The outlet of the motor-drive-side heat exchange assembly 3 can communicate with at least one of the heat exchange inlet of the water-cooled condenser 17 or the inlet of the cabin heat exchanger 2. The battery heat exchanger 4 is configured to heat or cool a battery. The inlet of the battery heat exchanger 4 communicates with the heat exchange outlet of the chiller 14. The outlet of the battery heat exchanger 4 can communicate with one of the inlet of the motor-drive-side heat exchange assembly 3 or the heat exchange inlet of the chiller 14. The inlet of the radiator tank 9 can communicate with the outlet of the motor-drive-side heat exchange assembly 3. The outlet of the radiator tank 9 can communicate with one of the inlet of the motor-drive-side heat exchange assembly 3 or the heat exchange inlet of the chiller 14.

In an embodiment, in this embodiment, the motor drive is composed of a motor and two drivers. The motor and the two drivers are disposed in parallel. Accordingly, as shown in FIG. 1, the motor-drive-side heat exchange assembly 3 is composed of a motor heat exchanger 31, a first driver heat exchanger 32, and a second driver heat exchanger 33. The motor heat exchanger 31, the first driver heat exchanger 32, and the second driver heat exchanger 33 are connected in series. The motor heat exchanger 31 is configured to heat or cool the motor. The first driver heat exchanger 32 is configured to heat or cool one driver. The second driver heat exchanger 33 is configured to heat or cool the other driver. In other embodiments, the number of motors and the number of drivers included in the motor drive are not limited to this embodiment, but may be other numbers. The motor and drivers are not limited to being disposed in series in this embodiment. The motor and drivers may also be disposed in parallel. Alternatively, two among the motor and drivers are connected in series and then disposed in parallel. At this time, the motor-drive-side heat exchange assembly 3 varies with the composition and the disposition of the motor drive.

The vehicle thermal management system of an electric vehicle provided in this embodiment can not only use the heat generated by the battery and the motor drive to heat the cabin, but also can cool the battery and the motor drive through the radiator tank 9. Moreover, the refrigeration assembly can refrigerate and heat the battery, cabin, and motor drive. After a circulating liquid absorbs or releases heat in the water evaporator 14, the circulating liquid can directly heat or cool the motor-drive-side heat exchange assembly 3 to cool the motor drive. After the circulating liquid absorbs or releases heat in the water evaporator 14, the circulating liquid can also heat or cool the motor-drive-side heat exchange assembly 3 and the battery heat exchanger 4 to heat or cool the motor drive and the battery at the same time. In this manner, the operation efficiency of a vehicle is improved, and the reliability of the system operation is increased. Moreover, the driving mileage of the electric vehicle is increased, and the electric vehicle can operate safely.

As shown in FIG. 1, in this embodiment, the vehicle thermal management system of an electric vehicle also includes a first three-way valve 6 and a second three-way valve 7. The first three-way valve 6 is formed with a first communication hole 601, a second communication hole 602, and a third communication hole 603. The first communication hole 601 can communicate with one of the second communication hole 602 or the third communication hole 603. The second three-way valve 7 is formed with a fourth communication hole 701, a fifth communication hole 702, and a sixth communication hole 703. The fourth communication hole 701 can communicate with one of the fifth communication hole 702 or the sixth communication hole 703. The first communication hole 601 communicates with the outlet of the motor-drive-side heat exchange assembly 3. The second communication hole 602 communicates with the fourth communication hole 701. The third communication hole 603 communicates with the inlet of the radiator tank 9. The fifth communication hole 702 communicates with the inlet of the cabin heat exchanger 2. The third communication hole 603 communicates with the heat exchange inlet of the water-cooled condenser 17.

In an embodiment, when the first communication hole 601 communicates with the third communication hole 603, the outlet of the motor-drive-side heat exchange assembly 3 communicates with the radiator tank 9 through the first three-way valve 6. At this time, the motor-drive-side heat exchange assembly 3 can radiate the heat generated during the operation of the motor drive to the external environment through the radiator tank 9. When the first communication hole 601 communicates with the second communication hole 602, and the fourth communication hole 701 communicates with the sixth communication hole 703, the outlet of the motor-drive-side heat exchange assembly 3 communicates with the heat exchange inlet of the water-cooled condenser 17. At this time, the water-cooled condenser 17 can heat or cool the motor drive through the motor-drive-side heat exchange assembly 3. When the first communication hole 601 communicates with the second communication hole 602, and the fourth communication hole 701 communicates with the fifth communication hole 702, the outlet of the motor-drive-side heat exchange assembly 3 communicates with the inlet of the cabin heat exchanger 2. At this time, the heat generated by the motor drive can be directly used to heat the cabin by the motor-drive-side heat exchange assembly 3 and the cabin heat exchanger 2.

As shown in FIG. 1, in this embodiment, the vehicle thermal management system of an electric vehicle also includes a third three-way valve 8. The third three-way valve 8 is formed with a seventh communication hole 801, an eighth communication hole 802, and a ninth communication hole 803. The seventh communication hole 801 can communicate with one of the eighth communication hole 802 or the ninth communication hole 803. The seventh communication hole 801 communicates with at least one of the two evaporators. The eighth communication hole 802 communicates with the air-cooled condenser 12. The ninth communication hole 803 communicates with the chiller 17. In an embodiment, when the seventh communication hole 801 communicates with the eighth communication hole 802, the air-cooled condenser 12 operates. When the seventh communication hole 801 communicates with the ninth communication hole 803, the water-cooled condenser 17 operates.

As shown in FIG. 1, in this embodiment, the vehicle thermal management system of an electric vehicle also includes a first four-way reversing valve 5. The first four-way reversing valve 5 includes a first reversing inlet 501, a second reversing inlet 502, a first reversing outlet 503, and a second reversing outlet 504. The first reversing inlet 501 communicates with one of the first reversing outlet 503 or the second reversing outlet 504. The second reversing inlet 502 communicates with another one of the first reversing outlet 503 or the second reversing outlet 504. The first reversing inlet 501 communicates with one of the outlet of the radiator tank 9 or the heat exchange outlet of the water-cooled condenser 17. The second reversing inlet 502 communicates with the outlet of the battery heat exchanger 4. The first reversing outlet 503 communicates with the heat exchange inlet of the chiller 14. The second reversing outlet 504 communicates with the inlet of the motor-drive-side heat exchange assembly 3.

As shown in FIG. 1, in this embodiment, the vehicle thermal management system of an electric vehicle also includes a water-cooled solenoid valve 30. The outlet of the water-cooled solenoid valve 30 is located between the outlet of the radiator tank 9 and the first reversing inlet 501. The inlet of the water-cooled solenoid valve 30 is located between the cabin evaporator 13 and the cabin heat exchanger 2.

As shown in FIG. 1, in this embodiment, the vehicle thermal management system of an electric vehicle also includes an economizer throttle valve 20 and an economizer body 10. The economizer body 10 is formed with a first connection hole, a second connection hole, an inlet, and an outlet. The first connection hole communicates with one of the air-cooled condenser 12 or the water-cooled condenser 17 through a connecting pipe. The outlet of the economizer throttle valve 20 communicates with the inlet. The inlet of the economizer throttle valve 20 communicates with the connecting pipe. The economizer throttle valve 20 can deliver a throttled refrigerant into the economizer body 10 through the inlet. The outlet communicates with the compressor 11 to deliver at least part of the refrigerant into the compressor 11. The second communication hole communicates with one of the cabin evaporator 13 or the chiller 14. The economizer throttle valve 20 and the economizer body 10 can increase the operation efficiency of the vehicle thermal management system of an electric vehicle.

As shown in FIG. 1, in this embodiment, the vehicle thermal management system of an electric vehicle also includes a first heating member 71 and a second heating member 72. The first heating member 71 is located on an upstream pipe of the heat exchange inlet of the chiller 14. The second heating member 72 is disposed on the cabin. The first heating member 71 and the second heating member 72 are each PTC. The first heating member 71 can heat the circulating liquid to prevent the temperature of the circulating fluid from being too low. The second heating member 72 can directly heat the cabin to implement rapid heating of the cabin.

It is to be noted that the refrigerant flows in the refrigeration assembly, and the circulating liquid flows in the cabin heat exchanger 2, the motor drive heat exchanger 3, the battery heat exchanger 4, and the radiator tank 9. The solidification temperature of the circulating fluid is low. In general, the solidification temperature of the circulating fluid is required to be lower than −30° C. The type of the circulating liquid is selected according to actual requirements. This is not limited in this embodiment.

As shown in FIG. 1, in this embodiment, the refrigeration assembly also includes a first expansion valve 15, a second expansion valve 16, and a third expansion valve 18. The two evaporators are disposed in parallel. When the refrigeration assembly performs refrigeration, the first expansion valve 15 is located at the upstream of the two evaporators, the second expansion valve 16 is connected in series with the chiller 14 and then connected in parallel with the cabin evaporator 13, and the third expansion valve 18 is connected in series with the cabin evaporator 13 and then connected in parallel with the chiller 14.

It is to be noted that the refrigeration of the refrigeration assembly refers to an operating condition in which the refrigerant of the refrigeration assembly flows through the compressor 11, the condensers, the economizer body 10, and the evaporators in sequence and then returns to the compressor 11, and the heating of the refrigeration assembly refers to an operating condition in which the refrigerant of the refrigeration assembly flows through the compressor 11, the evaporators, the economizer body 10, and the condensers in sequence and then returns to the compressor 11.

As shown in FIG. 1, the refrigeration assembly also includes a second four-way reversing valve 19. The second four-way reversing valve 19 is formed with a first connecting hole, a second connecting hole, a third connecting hole, and a fourth connecting hole. The first connecting hole can communicate with one of the two condensers. The second connecting hole can communicate with one of the two evaporators. The third connecting hole communicates with the inlet of the compressor 11. The fourth connecting hole communicates with the outlet of the compressor 11. The communication states of the first connecting hole, the second connecting hole, the third connecting hole, and the fourth connecting hole of the second four-way reversing valve 19 are switched to change the flow direction of the refrigerant, thereby implementing the refrigeration circulation or heating circulation of the refrigeration assembly.

To make the circulating fluid flow smoothly in a pipe, as shown in FIG. 1, in this embodiment, the vehicle thermal management system of an electric vehicle also includes a first water pump 81, a second water pump 82, and a third water pump 83. The first water pump 81 is located between the inlet of the battery heat exchanger 4 and the heat exchange outlet of the chiller 14. The second water pump 82 is located at the outlet of the motor-drive-side heat exchange assembly 3. The third water pump 83 is located at the upstream of the heat exchange inlet of the cabin evaporator 13 to pump the circulating liquid in the cabin heat exchanger 2 into the cabin evaporator 13.

In this embodiment, the vehicle thermal management system of an electric vehicle is applicable not only to an operating condition in which the cabin and the battery each needs forced cooling, and the motor drive does not need cooling in summer, but also to an operating condition in which the battery needs forced cooling, the cabin does not need forced cooling, and the motor drive does not need cooling in summer. The vehicle thermal management system of an electric vehicle is also applicable to an operating condition in which the battery does not need forced cooling, the cabin needs forced cooling, and the motor drive does not need cooling in summer. The vehicle thermal management system of an electric vehicle is also applicable to an operating condition in which the cabin does not need cooling or heating, and the battery and the motor drive each is required to be cooled by the radiator tank 9. The vehicle thermal management system of an electric vehicle is also applicable to an operating condition in which the cabin needs forced heating, the battery needs forced heating, and the motor drive does not need cooling. The vehicle thermal management system of an electric vehicle is also applicable to an operating condition in which the cabin needs forced heating, the battery does not need forced heating, and the motor drive does not need cooling. The vehicle thermal management system of an electric vehicle is also applicable to an operating condition in which the cabin does not need forced heating, the battery needs forced heating, and the motor drive does not need cooling. The vehicle thermal management system of an electric vehicle is also applicable to an operating condition in which the cabin needs forced heating, the battery needs forced heating, and the motor drive needs natural heat radiation. The vehicle thermal management system of an electric vehicle is also applicable to an operating condition in which the cabin does not need forced heating, the battery needs forced heating, and the motor drive needs natural heat radiation. The vehicle thermal management system of an electric vehicle is also applicable to an operating condition in which the cabin needs forced heating, the battery does not need forced heating, and the motor drive needs natural heat radiation. The vehicle thermal management system of an electric vehicle is also applicable to an operating condition in which the cabin needs forced heating, the battery needs forced heating, and the motor drive needs forced cooling. The vehicle thermal management system of an electric vehicle is also applicable to an operating condition in which the cabin does not need forced heating, the battery needs forced heating, and the motor drive needs forced cooling. The vehicle thermal management system of an electric vehicle is also applicable to an operating condition in which the cabin needs forced heating, the battery does not need forced heating, and the motor drive needs forced cooling. The vehicle thermal management system of an electric vehicle is also applicable to an operating condition in which when the battery temperature is relatively high during vehicle parking, the motor drive also needs forced cooling, and the cabin needs heating. The vehicle thermal management system of an electric vehicle is also applicable to an operating condition in response to an operation mode of the natural heating of the battery and the cabin. The vehicle thermal management system of an electric vehicle is also applicable to an operating condition in which the motor drive generates more heat, the battery does not need to be heated through a water-cooled, and the cabin needs heating. The details are below.

Figure 2:
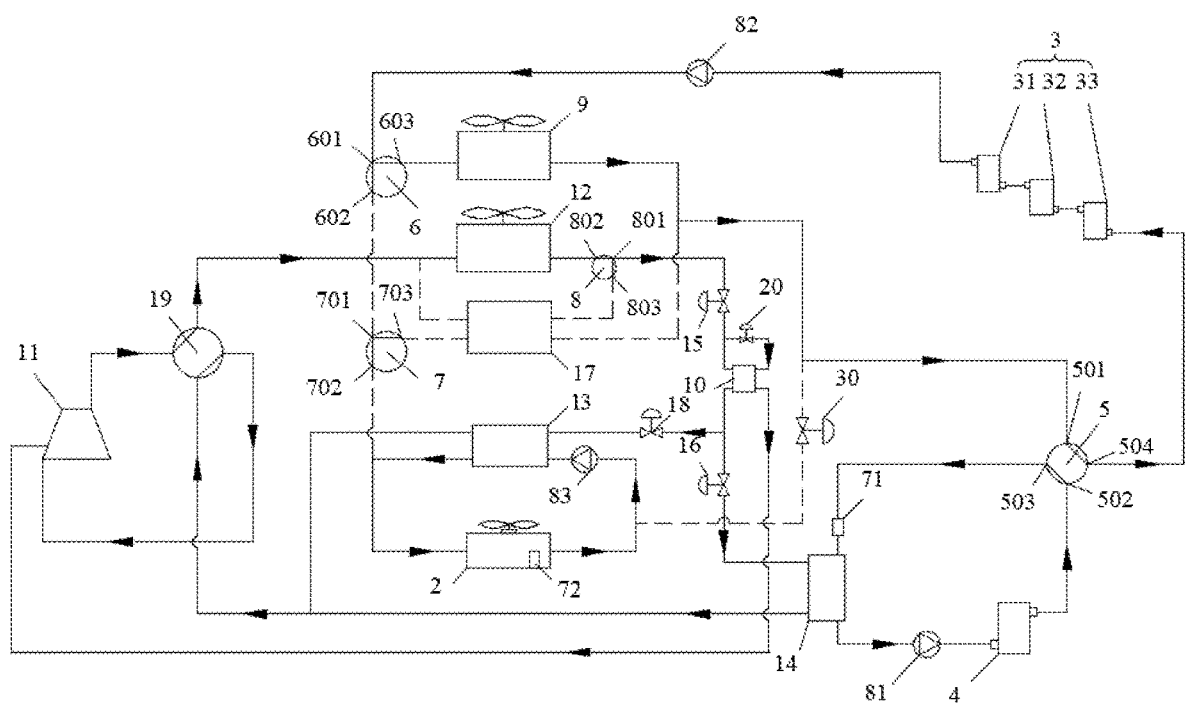
FIG. 2 is a diagram of the flow directions of a refrigerant and a circulating liquid of the vehicle thermal management system of an electric vehicle under a first operating condition according to embodiments of the present disclosure.

In a first operating condition, in summer, when the cabin and the battery each needs forced cooling, and the motor drive does not need cooling, as shown in FIG. 2, the first water pump 81, the second water pump 82, the third water pump 83, the first expansion valve 15, the second expansion valve 16, the third expansion valve 18, and the economizer throttle valve 20 are opened. At the same time, the second reversing inlet 502 of the first four-way reversing valve 5 communicates with the first reversing outlet 503. The first reversing inlet 501 of the first four-way reversing valve 5 communicates with the second reversing outlet 504. The first communication hole 601 of the first three-way valve 6 communicates with the third communication hole 603. The eighth communication hole 802 of the third three-way valve 8 communicates with the seventh communication hole 801. The refrigerant discharged from the outlet of the compressor 11 flows through the second four-way reversing valve 19, the air-cooled condenser 12, and the first expansion valve 15 in sequence. Part of the refrigerant enters the economizer body 10 directly through the first connection hole. The other part of the refrigerant enters the economizer body 10 from the inlet through the economizer throttle valve 20. Part of the refrigerant in the economizer body 10 flows into the compressor 11 from the outlet. The other part of the refrigerant flows out from the second communication hole and is divided into two parallel branches. One branch is the third expansion valve 18 and the cabin evaporator 13. The other branch is the second expansion valve 16 and the chiller 14. Then the refrigerants of the two branches are mixed, and the mixed refrigerant flows back to the compressor 11 through the second four-way reversing valve 19. At this time, the cabin evaporator 13 and the chiller 14 can absorb heat, so that the temperature of the circulating liquid in the cabin heat exchanger 2 and the temperature of the circulating liquid in the battery heat exchanger 4 are reduced. At this time, the cabin and battery are forcedly cooled. At the same time, the circulating liquid in the radiator tank 9 flows through the first four-way reversing valve 5, the motor-drive-side heat exchange assembly 3, and the second water pump 82 in sequence and then flows back to the radiator tank 9. The circulating fluid radiates heat in the radiator tank 9, so that the temperature of the motor drive is reduced. The heat absorbed by the circulating liquid can be radiated to the external environment by the radiator tank 9.

It is to be noted that the first operating condition is that the battery and the cabin are forcedly cooled. On this basis, the first operating condition may also be that the battery needs forced cooling, and the cabin does not need forced cooling. Alternatively, the first operating condition may also be that the cabin needs forced cooling, and the battery does not need forced cooling. In an embodiment, when the battery needs forced cooling, and the cabin does not need forced cooling, the third expansion valve 18 is closed on the basis of FIG. 2, and the refrigerant does not flow through the cabin evaporator 13 and the third expansion valve 18. When the cabin needs forced cooling, and the battery does not need forced cooling, the second expansion valve 16 is closed on the basis of FIG. 2, and the refrigerant does not flow through the battery heat exchanger 4 and the third expansion valve 16.

Figure 3:
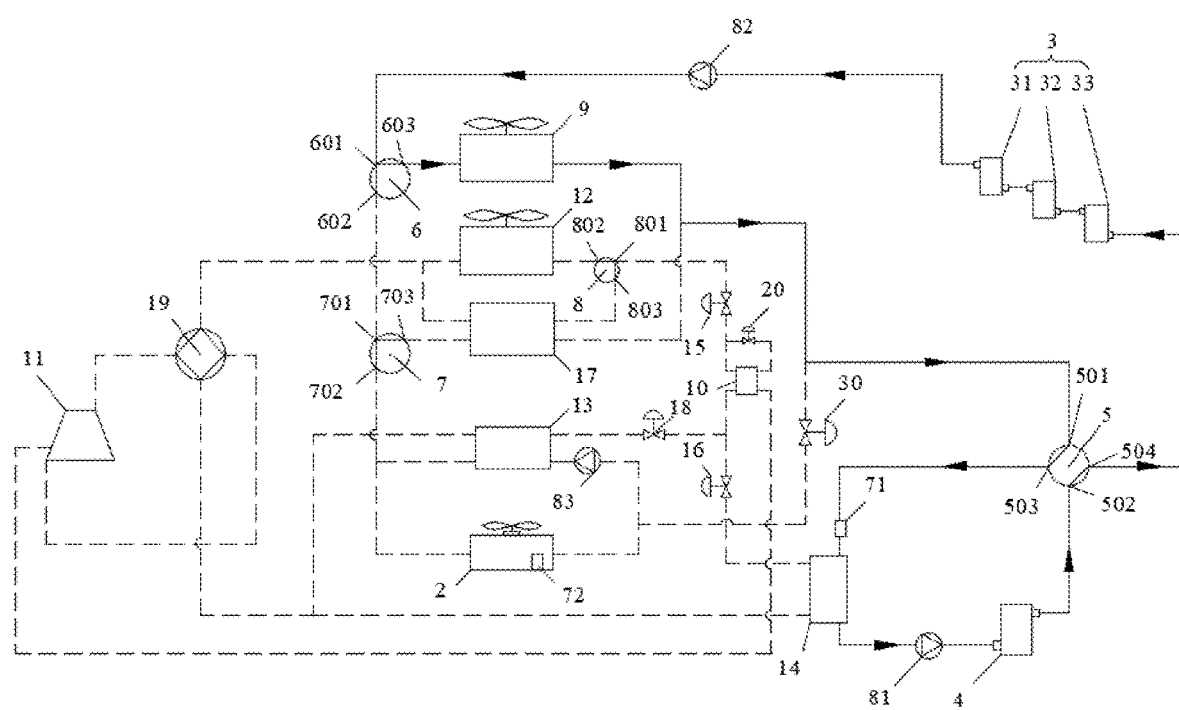
FIG. 3 is a diagram of the flow directions of the refrigerant and the circulating liquid of the vehicle thermal management system of an electric vehicle under a second operating condition according to embodiments of the present disclosure.

In a second operating condition, when the cabin does not need cooling or heating, and the battery and the motor drive each is required to be cooled by the radiator tank 9, as shown in FIG. 3, the first water pump 81 and the second water pump 82 are opened. At the same time, the first reversing inlet 501 of the first four-way reversing valve 5 communicates with the first reversing outlet 503. The second reversing inlet 502 communicates with the second reversing outlet 504. The first communication hole 601 of the first three-way valve 6 communicates with the third communication hole 603. The circulating liquid in the radiator tank 9 flows through the first four-way reversing valve 5, the first heating member 71, the water evaporator 14, the first water pump 81, the battery heat exchanger 4, the first four-way reversing valve 5, the motor-drive-side heat exchange assembly 3, the second water pump 82, and the first three-way valve 6 in sequence and then flows back to the radiator tank 9. At this time, the circulating liquid in the radiator tank 9 cools down the motor drive and the battery. It is to be noted that the first heating member 71 does not heat the circulating liquid in this process.

Figure 4:
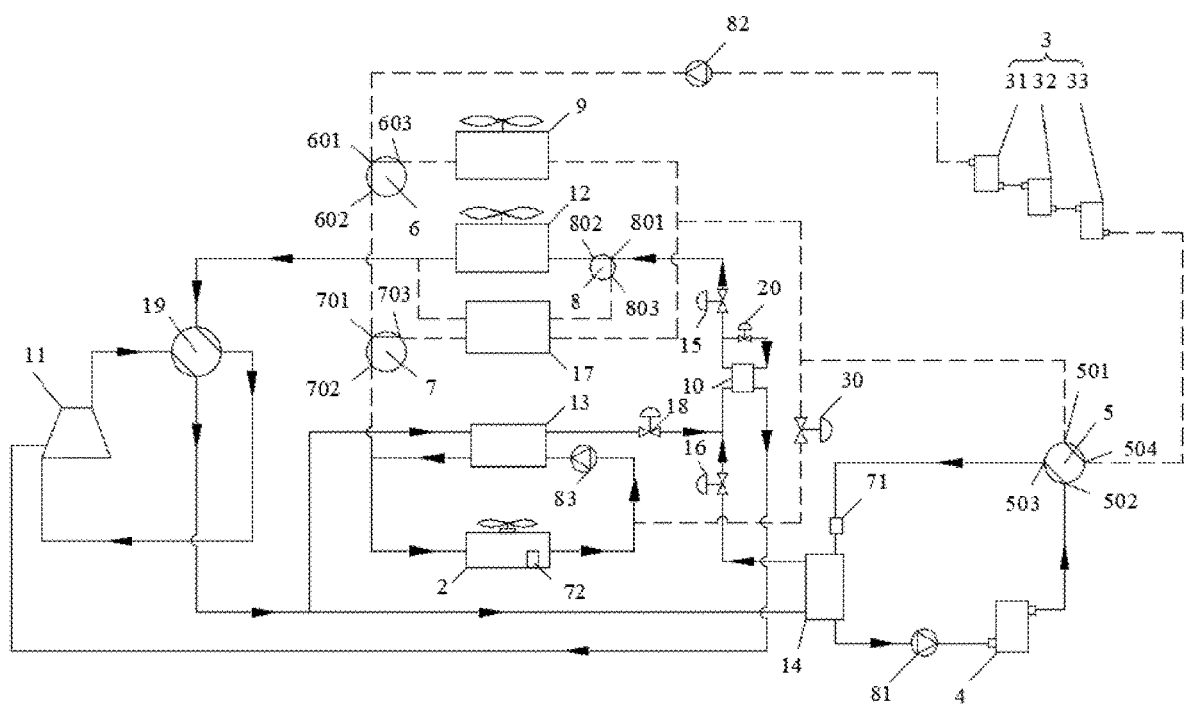
FIG. 4 is a diagram of the flow directions of the refrigerant and the circulating liquid of the vehicle thermal management system of an electric vehicle under a third operating condition according to embodiments of the present disclosure.

In a third operating condition, when the cabin needs forced heating, the battery needs forced heating, and the motor drive does not need cooling, as shown in FIG. 4, the first water pump 81, the third water pump 83, the first expansion valve 15, the second expansion valve 16, the third expansion valve 18, and the economizer throttle valve 20 are opened. At the same time, the second reversing inlet 502 of the first four-way reversing valve 5 communicates with the first reversing outlet 503. The refrigerant discharged from the outlet of the compressor 11 flows through the second four-way reversing valve 19 and is divided into two branches. One branch is the cabin evaporator 13 and the third expansion valve 18. The other branch is the chiller 14 and the second expansion valve 16. Then the refrigerants of the two branches are mixed, and the mixed refrigerant flows into the compressor 11 through the economizer body 10, the first expansion valve 15, the air-cooled condenser 12, and the second four-way reversing valve 19. At this time, the cabin evaporator 13 and the chiller 14 can release heat, so that the temperature of the circulating liquid in the cabin heat exchanger 2 and the temperature of the circulating liquid in the battery heat exchanger 4 are increased. At this time, the cabin and battery are forcedly heated.

It is to be noted that the third operating condition is that the battery and the cabin each needs forced heating. On this basis, the third operating condition may also be that the battery needs forced heating, and the cabin does not need forced heating. Alternatively, the third operating condition may also be that the cabin needs forced heating, and the battery does not need forced heating. In an embodiment, when the battery needs forced heating, and the cabin does not need forced heating, the third expansion valve 18 is closed on the basis of FIG. 4, and the refrigerant does not flow through the cabin evaporator 13 and the third expansion valve 18. When the cabin needs forced heating, and the battery does not need forced heating, the second expansion valve 16 is closed on the basis of FIG. 4, and the refrigerant does not flow through the battery heat exchanger 4 and the second expansion valve 16.

Figure 5:
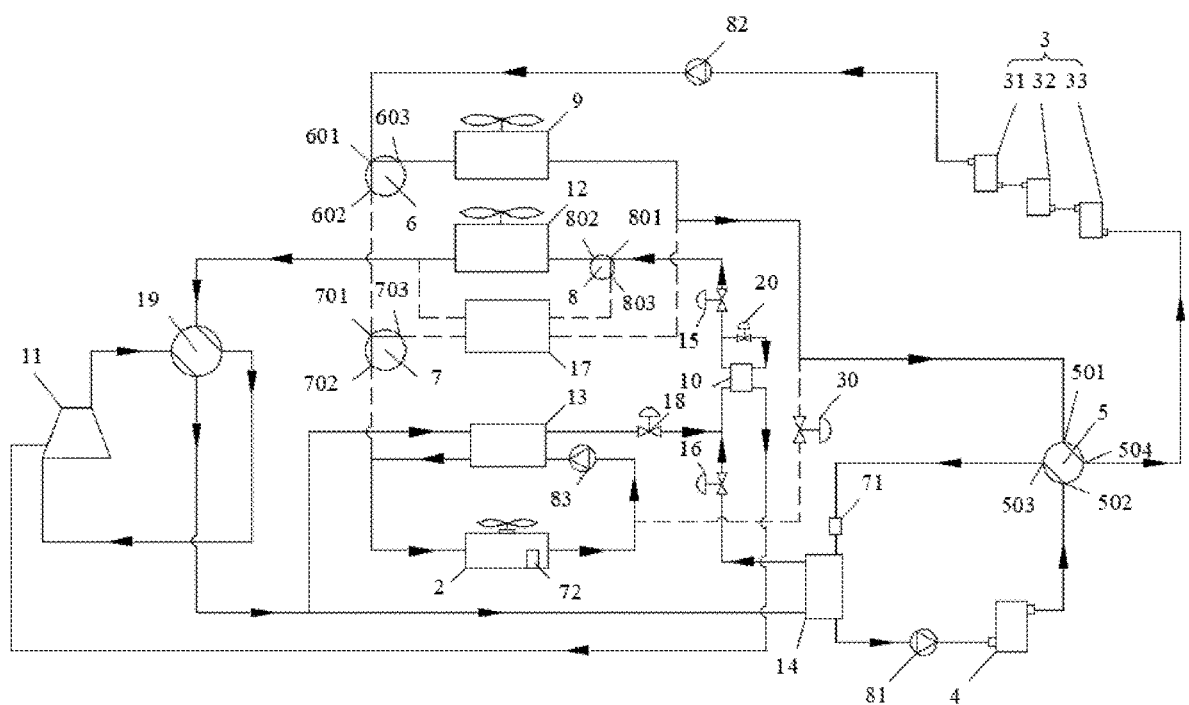
FIG. 5 is a diagram of the flow directions of the refrigerant and the circulating liquid of the vehicle thermal management system of an electric vehicle under a fourth operating condition according to embodiments of the present disclosure.

In a fourth operating condition, as shown in FIG. 5, on the basis of FIG. 4, heat radiation is performed on the motor drive. At this time, the second water pump 82 is opened on the basis of FIG. 4. At the same time, the first communication hole 601 of the first three-way valve 6 communicates with the third communication hole 603. The first reversing inlet 501 of the first four-way reversing valve 5 communicates with the second reversing outlet 504. The seventh communication hole 801 of the third three-way valve 8 communicates with the eighth communication hole 802. At this time, the circulating liquid in the radiator tank 9 flows through the first four-way reversing valve 5, the motor-drive-side heat exchange assembly 3, the second water pump 82, and the first three-way valve 6 in sequence and then flows back to the radiator tank 9. The circulating liquid in the motor-drive-side heat exchange assembly 3 absorbs heat from the motor drive and then radiates heat in the radiator tank 9, so that the temperature of the circulating fluid is reduced. In this manner, heat radiation is performed on the motor drive.

It is to be noted that the fourth operating condition is that the battery and the cabin each needs forced heating. On this basis, the fourth operating condition may also be that the battery needs forced heating, and the cabin does not need forced heating. Alternatively, the fourth operating condition may also be that the cabin needs forced heating, and the battery does not need forced heating. In an embodiment, when the battery needs forced heating, and the cabin does not need forced heating, the third expansion valve 18 is closed on the basis of FIG. 5, and the refrigerant does not flow through the cabin evaporator 13 and the third expansion valve 18. When the cabin needs forced heating, and the battery does not need forced heating, the second expansion valve 16 is closed on the basis of FIG. 4, and the refrigerant does not flow through the battery heat exchanger 5 and the second expansion valve 16.

Figure 6:
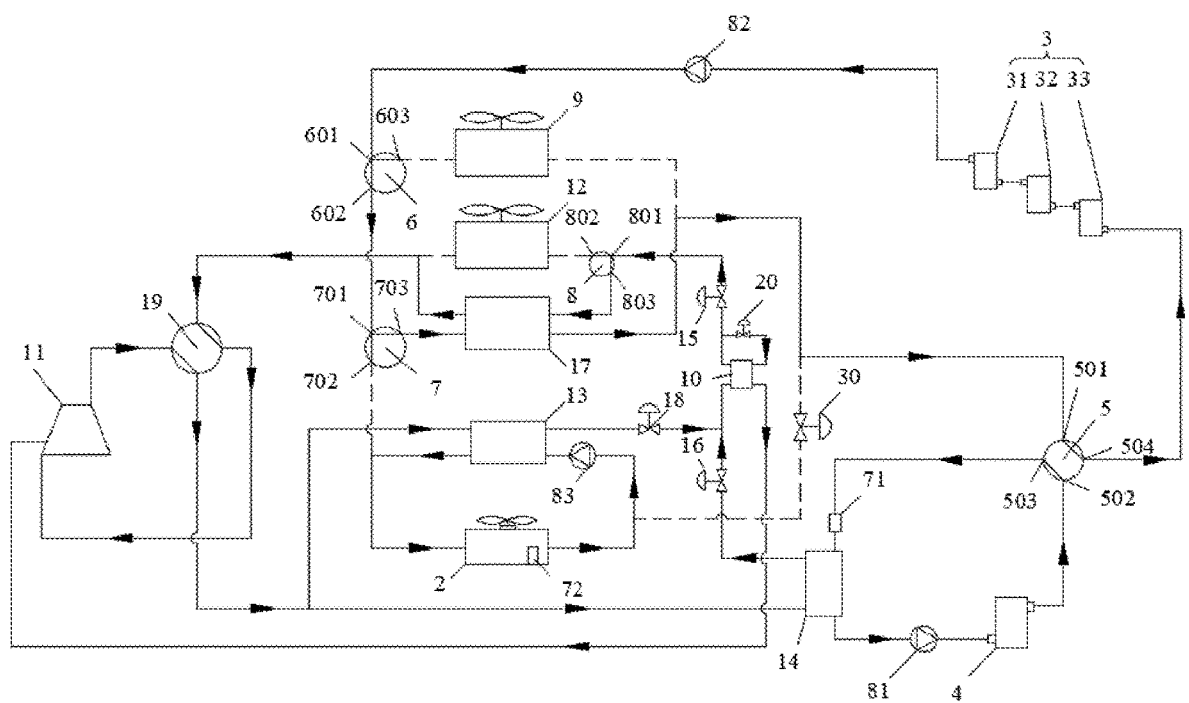
FIG. 6 is a diagram of the flow directions of the refrigerant and the circulating liquid of the vehicle thermal management system of an electric vehicle under a fifth operating condition according to embodiments of the present disclosure.

In a fifth operating condition, when the cabin needs forced heating, the battery needs forced heating, and the motor drive needs forced cooling, as shown in FIG. 6, the first water pump 81, the second water pump 82, the third water pump 83, the first expansion valve 15, the second expansion valve 16, the third expansion valve 18, and the economizer throttle valve 20 are opened. At the same time, the first reversing inlet 501 of the first four-way reversing valve 5 communicates with the second reversing outlet 504. The second reversing inlet 502 communicates with the first reversing outlet 503. The first communication hole 601 of the first three-way valve 6 communicates with the second communication hole 602. The fourth communication hole 701 of the second three-way valve 7 communicates with the sixth communication hole 703. The seventh communication hole 801 of the third three-way valve 8 communicates with the ninth communication hole 803. The refrigerant discharged from the outlet of the compressor 11 flows through the second four-way reversing valve 19 and is divided into two branches. One branch is the cabin evaporator 13 and the third expansion valve 18. The other branch is the chiller 14 and the second expansion valve 16. Then the refrigerants of the two branches are mixed, and the mixed refrigerant flows into the compressor 11 through the economizer body 10, the first expansion valve 15, the water-cooled condenser 17, and the second four-way reversing valve 19. At this time, the cabin evaporator 13 and the chiller 14 can release heat, so that the temperature of the circulating liquid in the cabin heat exchanger 2 and the temperature of the circulating liquid in the battery heat exchanger 4 are increased. At this time, the cabin and battery are forcedly heated. The circulating liquid in the motor-drive-side heat exchange assembly 3 flows through the second water pump 82, the first three-way valve 6, the second three-way valve 7, the water-cooled condenser 17, and the first four-way reversing valve 5 in sequence and then returns to the motor-drive-side heat exchange assembly 3. The circulating liquid in the motor-drive-side heat exchange assembly 3 absorbs heat from the motor drive and then radiates heat in the water-cooled condenser 17, so that the temperature of the circulating fluid is reduced. In this manner, the motor drive is forcedly cooled.

It is to be noted that the fifth operating condition is that the battery and the cabin each needs forced heating. On this basis, the fifth operating condition may also be that the battery needs forced heating, and the cabin does not need forced heating. Alternatively, the fifth operating condition may also be that the cabin needs forced heating, and the battery does not need forced heating. In an embodiment, when the battery needs forced heating, and the cabin does not need forced heating, the third expansion valve 18 is closed on the basis of FIG. 6, and the refrigerant does not flow through the cabin evaporator 13 and the third expansion valve 18. When the cabin needs forced heating, and the battery does not need forced heating, the second expansion valve 16 is closed on the basis of FIG. 6, and the refrigerant does not flow through the battery heat exchanger 4 and the second expansion valve 16.

On the basis of the fifth operating condition, after the motor drive temperature is too high, the first communication hole 601 of the first three-way valve 6 communicates with the second communication hole 602 and the third communication hole 603 at the same time. At this time, part of the circulating liquid in the motor drive heat exchanger assembly 3 is radiated by the radiator tank.

Figure 7:
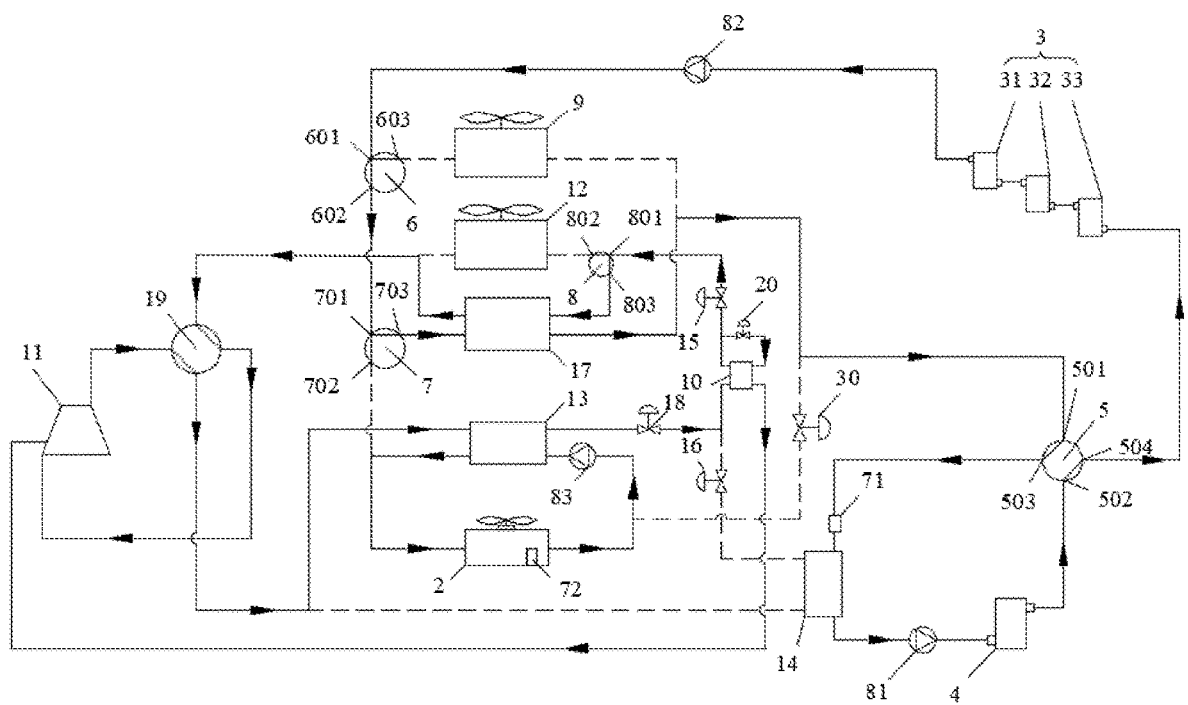
FIG. 7 is a diagram of the flow directions of the refrigerant and the circulating liquid of the vehicle thermal management system of an electric vehicle under a sixth operating condition according to embodiments of the present disclosure.

In a sixth operating condition, when the vehicle is parked, the temperature of the battery is relatively high. For example, when the temperature of the battery reaches 34° C., the battery needs forced cooling, the motor drive also needs forced cooling, and the cabin needs heating, as shown in FIG. 7, the first water pump 81, the second water pump 82, the third water pump 83, the first expansion valve 15, the third expansion valve 18, and the economizer throttle valve 20 are opened. At the same time, the first reversing inlet 501 of the first four-way reversing valve 5 communicates with the first reversing outlet 503. The second reversing inlet 502 communicates with the second reversing outlet 504. The first communication hole 601 of the first three-way valve 6 communicates with the second communication hole 602. The fourth communication hole 701 of the second three-way valve 7 communicates with the sixth communication hole 703. The seventh communication hole 801 of the third three-way valve 8 communicates with the ninth communication hole 803. The refrigerant discharged from the outlet of the compressor 11 flows through the second four-way reversing valve 19, the cabin evaporator 13, the third expansion valve 18, the economizer body 10, the first expansion valve 15, the water-cooled condenser 17, and the second four-way reversing valve 19 and then flows into the compressor 11. At this time, the cabin evaporator 13 can release heat, so that the temperature of the circulating liquid in the cabin heat exchanger 2 is increased. At this time, the cabin is forcedly heated. At this time, the circulating liquid in the motor-drive-side heat exchange assembly 3 flows through the second water pump 82, the first three-way valve 6, the second three-way valve 7, the water-cooled condenser 17, the first four-way reversing valve 5, and the first heating member 71, the chiller 14, the first water pump 81, the battery heat exchanger 4, and the first four-way reversing valve 5 in sequence and then returns to the motor driven heat exchange assembly 3. The circulating liquid in the motor drive heat exchange module 3 absorbs heat from the motor drive and then radiates heat in the water-cooled condenser 17. The circulating liquid in the battery heat exchanger 4 absorbs heat from the battery and then can be cooled in the water-cooled condenser 17. In this manner, the motor drive and the battery are forcedly cooled. At this time, the heat of the battery and the motor drive transfers the low-grade heat of the circulating liquid to a refrigeration system through the water-cooled condenser 17, and the low-grade heat is raised to high-grade heat by the heat pump circulation of the refrigeration system to heat the cabin.

Figure 8:
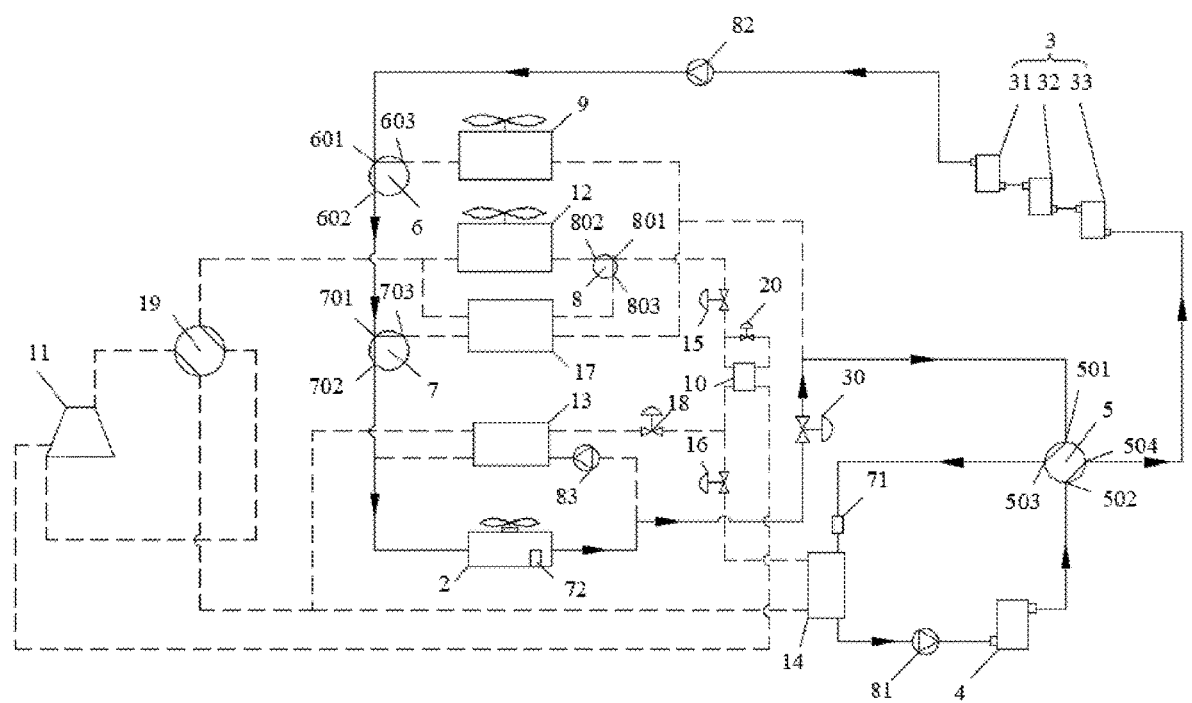
FIG. 8 is a diagram of the flow directions of the refrigerant and the circulating liquid of the vehicle thermal management system of an electric vehicle under a seventh operating condition according to embodiments of the present disclosure.

A seventh operating condition is in response to the operation mode of the natural heating of the battery and the cabin, as shown in FIG. 8. At this time, the heat generated by the motor drive is relatively high, and the refrigeration system is shut down. The first water pump 81, the second water pump 82, and the water-cooled solenoid valve 30 are opened. The first reversing inlet 501 of the first four-way reversing valve 5 communicates with the first reversing outlet 503. The second reversing inlet 502 communicates with the second reversing outlet 504. The first communication hole 601 of the first three-way valve 6 communicates with the second communication hole 602. The fourth communication hole 701 of the second three-way valve 7 communicates with the fifth communication hole 702. At this time, the circulating liquid in the motor-drive-side heat exchange assembly 3 flows through the second water pump 82, the first three-way valve 6, the second three-way valve 7, the cabin heat exchanger 17, the water-cooled solenoid valve 30, the first four-way reversing valve 5, and the first heating member 71, the chiller 14, the first water pump 81, the battery heat exchanger 4, and the first four-way reversing valve 5 in sequence and then returns to the motor driven heat exchange assembly 3. Since the heat of the motor drive is high-grade heat, for example, hot water at 50° C. to 60° C., the hot water flows through the cabin and the battery heat exchanger 4 to heat or cool the cabin and the battery.

Figure 9:
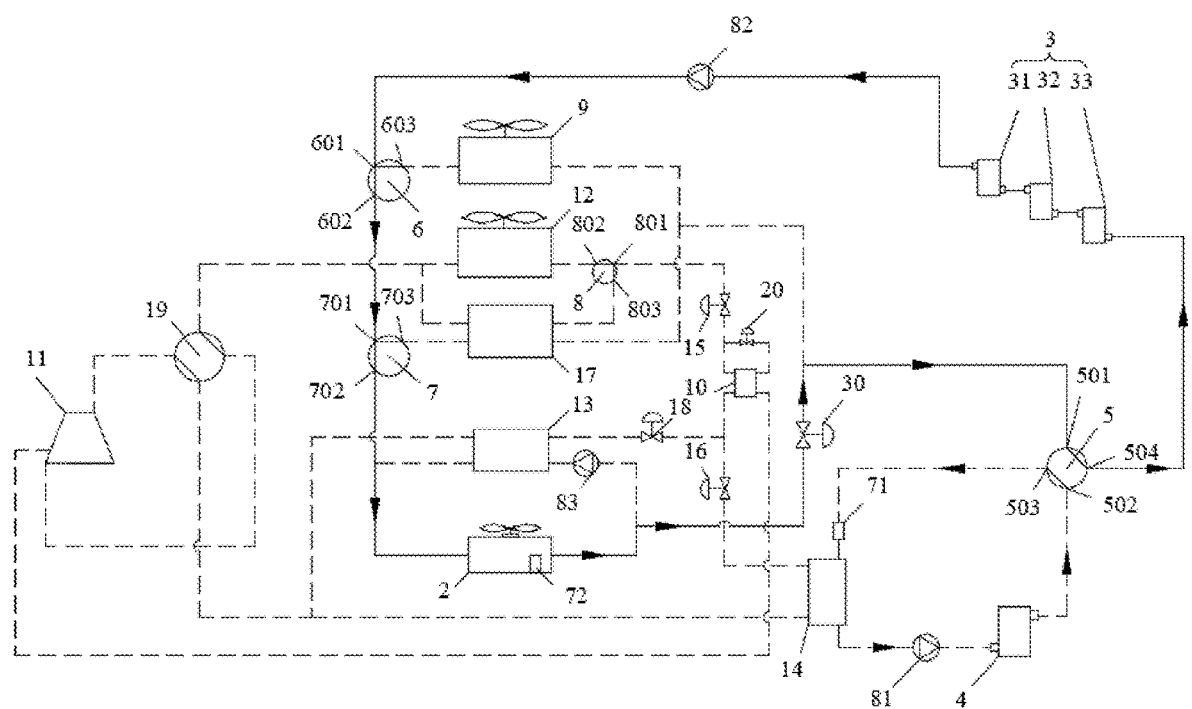
FIG. 9 is a diagram of the flow directions of the refrigerant and the circulating liquid of the vehicle thermal management system of an electric vehicle under an eighth operating condition according to embodiments of the present disclosure.

In an eighth operating condition, when the motor drive generates more heat, the battery does not need to be heated through the water-cooled, and the cabin needs heating, the high temperature circulating fluid generated by the motor drive may be directly used to heat the cabin. As shown in FIG. 9, the second water pump 82 and the water-cooled solenoid valve 30 are opened. The first reversing inlet 501 of the first four-way reversing valve 5 communicates with the second reversing outlet 504. The first communication hole 601 of the first three-way valve 6 communicates with the second communication hole 602. The fourth communication hole 701 of the second three-way valve 7 communicates with the fifth communication hole 702. At this time, the circulating liquid in the motor-drive-side heat exchange assembly 3 flows through the second water pump 82, the first three-way valve 6, the second three-way valve 7, the cabin heat exchanger 2, the water-cooled solenoid valve 30, and the first four-way reversing valve 5 in sequence and then returns to the motor-drive-side heat exchange assembly 3. Since the heat of the motor drive is high-grade heat, for example, hot water at 50° C. to 60° C., the hot water then flows through the cabin, thereby heating the cabin.

It is to be noted that in winter, when the mist in the electric vehicle is required to be removed, and the cabin temperature is low and is required to be heated, the second heating member 72, the third water pump 83, the first expansion valve 15, the third expansion valve 18, and the economizer throttle valve 20 are opened. The seventh communication hole 801 of the third three-way valve 8 communicates with the eighth communication hole 802. The refrigerant flowing out of the outlet of the compressor 11 flows through the second four-way reversing valve 19, the air-cooled condenser 12, the first expansion valve 15, the economizer body 10, the third expansion valve 18, the cabin evaporator 13, and the second four-way reversing valve 19 in sequence and then returns to the compressor 11. At this time, the cabin evaporator 13 can absorb the heat of the circulating liquid of the cabin heat exchanger 2. In this manner, the cabin heat exchanger 2 is cooled, and the mist in the electric vehicle is condensed into water droplets in the cabin heat exchanger 2, thereby removing the mist. At the same time, the second heating member 72 heats the cabin, so that the temperature of the cabin is increased, thereby heating the cabin.

It is to be noted that when the system is used in winter, the first heating member 71 is selectively opened according to the temperature condition of the circulating fluid. If the temperature of the circulating fluid is too low, the first heating member 71 may be opened to heat the circulating fluid. When the temperature of the circulating liquid reaches a set temperature, the first heating member 71 may be closed. In an embodiment, the first heating member 71 is opened or closed according to the actual operating conditions.

An embodiment provides a control method applied by the vehicle thermal management system of an electric vehicle according to the preceding solution. The method includes the steps below.

When the cabin is required to be refrigerated, the cabin evaporator 13 communicates with the air-cooled condenser 12, the refrigeration assembly performs refrigeration circulation; the inlet of the cabin heat exchanger 2 communicates with the heat exchange outlet of the cabin evaporator 13, and the outlet of the cabin heat exchanger 2 communicates with the heat exchange inlet of the cabin evaporator 13.

When the cabin is required to be heated, the cabin evaporator 13 communicates with one of the two condensers, the refrigeration assembly performs heating circulation, the inlet of the cabin heat exchanger 2 communicates with the heat exchange outlet of the cabin evaporator 13, and the outlet of the cabin heat exchanger 2 communicates with the heat exchange inlet of the cabin evaporator 13.

When the battery is required to be refrigerated, the chiller 14 communicates with the air-cooled condenser 12, the refrigeration assembly performs refrigeration circulation, the inlet of the battery heat exchanger 4 communicates with the heat exchange outlet of the chiller 14, and the outlet of the battery heat exchanger 4 communicates with the heat exchange inlet of the chiller 14.

When the battery is required to be heated, the chiller 14 communicates with one of the two condensers, the refrigeration assembly performs heating circulation, the inlet of the battery heat exchanger 4 communicates with the heat exchange outlet of the chiller 14, and the outlet of the battery heat exchanger 4 communicates with the heat exchange inlet of the chiller 14.

When the motor drive is required to be cooled by the radiator tank 9, the outlet of the motor-drive-side heat exchange assembly 3 communicates with the heat exchange inlet of the radiator tank 9, and the inlet of the motor-driveside heat exchange assembly 3 communicates with the heat exchange outlet of the radiator tank 9.

When the battery is required to be cooled by the radiator tank 9, the outlet of the motor-drive-side heat exchange assembly 3 communicates with the heat exchange inlet of the radiator tank 9, and the heat exchange outlet of the radiator tank 9 communicates with the inlet of the motor-drive-side heat exchange assembly 3 through the chiller 14 and the battery heat exchanger 4 in sequence.

When the cabin is heated during winter parking by using heat generated by the battery, and the temperature of the battery is between a first preset temperature and a second preset temperature, the inlet of the battery heat exchanger 4 communicates with the heat exchange outlet of the chiller 14, the outlet of the battery heat exchanger 4 communicates with the inlet of the cabin heat exchanger 2 through the motor-drive-side heat exchange assembly 3, and the outlet of the cabin heat exchanger 2 communicates with the heat exchange inlet of the chiller 14.

When the cabin is heated during winter parking by using heat generated by the motor drive, and the temperature of the motor drive is higher than a third preset temperature, the inlet of the motor-drive-side heat exchange assembly 3 communicates with the outlet of the cabin heat exchanger 2, and the outlet of the motor-drive-side heat exchange assembly 3 communicates with the inlet of the cabin heat exchanger 2.

The control method of the vehicle thermal management system of an electric vehicle provided by this embodiment has the characteristics of high operation efficiency, a good reliability, a long driving mileage, and high safety.

It is to be noted that the preceding are embodiments of the present disclosure and technical principles used therein. It is to be understood by those skilled in the art that the present disclosure is not limited to the embodiments described herein. Those skilled in the art can make various apparent modifications, adaptations, and substitutions without departing from the scope of the present disclosure. Therefore, while the present disclosure has been described in detail through the preceding embodiment, the present disclosure is not limited to the preceding embodiment and may include more other equivalent embodiments without departing from the concept of the present disclosure. The scope of the present disclosure is determined by the scope of the appended claims.

What is claimed is:

1. A vehicle thermal management system of an electric vehicle, comprising:
    a refrigeration assembly, a first four-way reversing valve, a water-cooled solenoid valve, a cabin heat exchanger, a motor-drive-side heat exchange assembly, a battery heat exchanger and a radiator tank;
    wherein the refrigeration assembly comprises a compressor, two condensers, and two evaporators, wherein the compressor is configured to communicate with one of the two condensers and at least one of the two evaporators, the two condensers are an air-cooled condenser and a water-cooled condenser respectively, and the two evaporators are a cabin evaporator and a chiller respectively;
    wherein the first four-way reversing valve comprises a first reversing inlet, a second reversing inlet, a first reversing outlet, and a second reversing outlet, the first reversing inlet communicates with one of the first reversing outlet or the second reversing outlet, the second reversing inlet communicates with another one of the first reversing outlet or the second reversing outlet, the first reversing inlet communicates with one of an outlet of the radiator tank or a heat exchange outlet of the water-cooled condenser, the second reversing inlet communicates with an outlet of the battery heat exchanger, the first reversing outlet communicates with a heat exchange inlet of the chiller, and the second reversing outlet communicates with an inlet of the motor-drive-side heat exchange assembly;
    wherein an outlet of the water-cooled solenoid valve is located between the outlet of the radiator tank and the first reversing inlet, and an inlet of the water-cooled solenoid valve is located between the cabin evaporator and the cabin heat exchanger;
    wherein the cabin heat exchanger is configured to heat a cabin in a case where one of following conditions are satisfied:
        the water-cooled solenoid valve is opened, the first reversing inlet and the first reversing outlet are in communication, an inlet of the cabin heat exchanger is configured to communicate with an outlet of the motor-drive-side heat exchange assembly, and an outlet of the cabin heat exchanger is configured to communicate with the heat exchange inlet of the chiller; or
        the water-cooled solenoid valve is closed, the inlet of the cabin heat exchanger is configured to communicate with a heat exchange outlet of the cabin evaporator, and the outlet of the cabin heat exchanger is configured to communicate with a heat exchange inlet of the cabin evaporator;
    wherein the motor-drive-side heat exchange assembly s configured to cool a motor drive in a case where the following condition is satisfied:
        the water-cooled solenoid valve is closed, the first reversing inlet and the first reversing outlet are in communication, the second reversing inlet and the second reversing outlet are in communication, the inlet of the motor-drive-side heat exchange assembly is configured to communicate with a heat exchange outlet of the chiller, and the outlet of the motor-drive-side heat exchange assembly is configured to communicate with a heat exchange inlet of the water-cooled condenser;
    wherein the battery heat exchanger is configured to heat or cool a battery, wherein an inlet of the battery heat exchanger is configured to communicate with the heat exchange outlet of the chiller, and an outlet of the battery heat exchanger is configured to communicate with one of the inlet of the motor-drive-side heat exchange assembly or the heat exchange inlet of the chiller; and
    wherein an inlet of the radiator tank is configured to communicate with the outlet of the motor-drive-side heat exchange assembly, and the outlet of the radiator tank is configured to communicate with one of the inlet of the motor-drive-side heat exchange assembly or the heat exchange inlet of the chiller.

2. The system according to claim 1, further comprising a first three-way valve and a second three-way valve, wherein the first three-way valve is formed with a first communication hole, a second communication hole, and a third communication hole, the first communication hole is configured to communicate with one of the second communication hole or the third communication hole, the second three-way valve is formed with a fourth communication hole, a fifth communication hole, and a sixth communication hole, the fourth communication hole is configured to communicate with one of the fifth communication hole or the sixth communication hole, the first communication hole communicates with the outlet of the motor-drive-side heat exchange assembly, the second communication hole communicates with the fourth communication hole, the third communication hole communicates with the inlet of the radiator tank, the fifth communication hole communicates with the inlet of the cabin heat exchanger, and the third communication hole communicates with the heat exchange inlet of the water-cooled condenser.

3. The system according to claim 1, further comprising a third three-way valve, wherein the third three-way valve is formed with a seventh communication hole, an eighth communication hole, and a ninth communication hole, the seventh communication hole is configured to communicate with one of the eighth communication hole or the ninth communication hole, the seventh communication hole communicates with the at least one of the two evaporators, the eighth communication hole communicates with the air-cooled condenser, and the ninth communication hole communicates with the water-cooled condenser.

4. The system according to claim 1, further comprising an economizer throttle valve and an economizer body, wherein the economizer body is formed with a first connection hole, a second connection hole, an inlet, and an outlet, the first connection hole communicates with one of the two condensers through a connecting pipe, an outlet of the economizer throttle valve communicates with the inlet, an inlet of the economizer throttle valve communicates with the connecting pipe, the outlet communicates with the compressor, and the second connection hole communicates with one of the two evaporators.

5. The system according to claim 1, further comprising a first heating member and a second heating member, wherein the first heating member is located on an upstream pipe of the heat exchange inlet of the chiller, and the second heating member is disposed on the cabin.

6. The system according to claim 1, wherein the refrigeration assembly further comprises a first expansion valve, a second expansion valve, and a third expansion valve, the two evaporators are disposed in parallel, and when the refrigeration assembly performs refrigeration, the first expansion valve is located at an upstream of the two evaporators, the second expansion valve is connected in series with the chiller and then connected in parallel with the cabin evaporator, and the third expansion valve is connected in series with the cabin evaporator and then connected in parallel with the chiller.

7. The system according to claim 1, further comprising a first water pump, a second water pump, and a third water pump, wherein the first water pump is located between the inlet of the battery heat exchanger and the heat exchange outlet of the chiller, the second water pump is located at the outlet of the motor-drive-side heat exchange assembly, and the third water pump is located at an upstream of the heat exchange inlet of the cabin evaporator to pump a circulating liquid in the cabin heat exchanger into the cabin evaporator.

8. A control method applied by the system according to claim 1, comprising:
when the cabin is required to be refrigerated, the cabin evaporator communicates with the air-cooled condenser, the refrigeration assembly performs refrigeration circulation, the inlet of the cabin heat exchanger communicates with the heat exchange outlet of the cabin evaporator, and the outlet of the cabin heat exchanger communicates with the heat exchange inlet of the cabin evaporator;

when the cabin is required to be heated, the cabin evaporator communicates with one of the two condensers, the refrigeration assembly performs heating circulation, the inlet of the cabin heat exchanger communicates with the heat exchange outlet of the cabin evaporator, and the outlet of the cabin heat exchanger communicates with the heat exchange inlet of the cabin evaporator;

when the battery is required to be refrigerated, the chiller communicates with the air-cooled condenser, the refrigeration assembly performs refrigeration circulation, the inlet of the battery heat exchanger communicates with the heat exchange outlet of the chiller, and the outlet of the battery heat exchanger communicates with the heat exchange inlet of the chiller;

when the battery is required to be heated, the chiller communicates with one of the two condensers, the refrigeration assembly performs heating circulation, the inlet of the battery heat exchanger communicates with the heat exchange outlet of the chiller, and the outlet of the battery heat exchanger communicates with the heat exchange inlet of the chiller;

when the motor drive is required to be cooled by the radiator tank, the outlet of the motor-drive-side heat exchange assembly communicates with a heat exchange inlet of the radiator tank, and the inlet of the motor-drive-side heat exchange assembly communicates with a heat exchange outlet of the radiator tank;

when the battery is required to be cooled by the radiator tank, the outlet of the motor-drive-side heat exchange assembly communicates with the heat exchange inlet of the radiator tank, and the heat exchange outlet of the radiator tank communicates with the inlet of the motor-drive-side heat exchange assembly through the chiller and the battery heat exchanger in sequence;

when the cabin is heated during winter parking by using heat generated by the battery, and a temperature of the battery is between a first preset temperature and a second preset temperature, the inlet of the battery heat exchanger communicates with the heat exchange outlet of the chiller, the outlet of the battery heat exchanger communicates with the inlet of the cabin heat exchanger through the motor-drive-side heat exchange assembly, and the outlet of the cabin heat exchanger communicates with the heat exchange inlet of the chiller; and when the cabin is heated during winter parking by using heat generated by the motor drive, and a temperature of the motor drive is higher than a third preset temperature, the inlet of the motor-drive-side heat exchange assembly communicates with the outlet of the cabin heat exchanger, and the outlet of the motor-drive-side heat exchange assembly communicates with the inlet of the cabin heat exchanger.

* * * * *